United States Patent [19]

Patterson et al.

[11] Patent Number: 5,582,674
[45] Date of Patent: Dec. 10, 1996

[54] COMPOSITE INTEGRAL SHEET OF HIGHLY ABSORBENT WRAP MATERIAL WITH HYDROPHOBIC WATER-VAPOR-PERMEABLE PELLICLE AND METHOD OF MAKING SAME

[75] Inventors: Robert Patterson, Neenah; Daniel J. Geddes, Appleton; David H. Hollenberg, Neenah; Patrick L. Maynard, Combined Locks, all of Wis.

[73] Assignee: The James River Corporation, Richmond, Va.

[21] Appl. No.: 478,851

[22] Filed: Jun. 7, 1995

Related U.S. Application Data

[63] Continuation of Ser. No. 371,670, Jan. 12, 1995, Pat. No. 5,480,693, which is a continuation of Ser. No. 158,171, Nov. 24, 1993, abandoned, which is a continuation of Ser. No. 714,928, Jun. 13, 1991, abandoned.

[51] Int. Cl.$^6$ .................................................. B32B 31/00
[52] U.S. Cl. ................ 156/290; 156/311; 427/385.5; 427/389.9; 427/391; 427/394; 427/395
[58] Field of Search .................................. 156/290, 282, 156/311; 427/384, 385.5, 389.9, 394, 391, 395

[56] References Cited

U.S. PATENT DOCUMENTS

| | | | |
|---|---|---|---|
| 4,726,976 | 2/1988 | Karami et al. | 428/137 |
| 4,865,854 | 8/1987 | Larson | 426/107 |
| 4,919,738 | 4/1990 | Ball et al. | 156/73.5 |
| 4,935,276 | 6/1990 | Pawlowski et al. | 428/35.7 |
| 4,984,907 | 1/1991 | Power | 383/109 |
| 5,055,332 | 10/1991 | Rhodes et al. | 428/74 |
| 5,126,382 | 6/1992 | Hollenberg | 524/56 |
| 5,128,182 | 7/1992 | Bunker et al. | 428/34.3 |
| 5,194,315 | 3/1993 | Itoh | 428/178 |
| 5,376,392 | 12/1994 | Ikegami et al. | 426/127 |
| 5,399,366 | 3/1995 | Geddes et al. | 426/87 |

*Primary Examiner*—Patrick Ryan
*Assistant Examiner*—Marie R. Yamnitzky
*Attorney, Agent, or Firm*—Finnegan, Henderson, Farabow, Garrett & Dunner, L.L.P.

[57] ABSTRACT

A composite integral sheet of wrap material which includes a first layer of absorbent material containing fibers bearing foraminous hydrophobic water-vapor-permeable pellicles, a second layer of printable material and an impermeable pigmented polymer layer interposed between the first and second layers. Additionally, the absorbent layer will include highly absorbent material formed by in-situ crosslinking of a partially pre-neutralized polyacrylic acid. The composite wrap material has a plurality of air pockets formed between at least one of the first or second layers and the polymer layer, by discontinuously bonding the first or second layers to the polymer material. A method of making the composite integral sheet.

20 Claims, 2 Drawing Sheets

COMPOSITE INTEGRAL SHEET OF HIGHLY ABSORBENT WRAP MATERIAL WITH HYDROPHOBIC WATER-VAPOR-PERMEABLE PELLICLE AND METHOD OF MAKING SAME

This is a division of application Ser. No. 08/371,670, filed Jan. 12, 1995; which is a continuation of application Ser. No. 08/158,171, filed Nov. 24, 1993; which is a continuation of application Ser. No. 07/714,928, filed Jun. 13, 1991, which applications are herein incorporated by reference in their entirety. Ser. Nos. 07/714,928 and 08/158,171 are now abandoned. Ser. No. 08/371,670 is now U.S. Pat. No. 5,480,693.

BACKGROUND

Hot sandwiches are ideal for convenience foods in many ways, they can be quickly prepared, quickly consumed, utensils are not required and basic ingredients from a reasonable selection can be combined in countless variations to provide a wide variety of appetizing sandwiches. However, the perfect convenience food could be prepared before it is needed, stored, then served almost immediately after the customer places his order. In this respect, hot sandwiches fall short of being perfect convenience foods, as it is difficult to provide a suitable but inexpensive and ecologically sound environment for maintaining hot sandwiches in palatable condition for the storage interval between preparation and consumption, particularly for periods of more than several minutes. Styrofoam clamshells have been used but many who are concerned about the environment feel that the clamshell requires too much volume in landfill, is not at all biodegradable and is quite difficult to economically recycle. Further, they only provide for rather limited storage periods. However, they do protect the sandwich from physical deformation rather well while the top gives the customer a convenient spot for french fries or onion rings.

More recently, composite sandwich wraps have been introduced which are considerably more effective in controlling moisture and keeping hot sandwiches at proper temperature, while overcoming or reducing many of the ecological problems associated with clamshells. These three layer wraps comprise an absorbent inner layer, a foldable, printable outer layer and a moisture-vapor-impermeable barrier layer in between wherein at least one of the interior or exterior layers are discontinuously bonded to the moisture-vapor-impermeable layer to form pockets which communicate with each other allowing flow of air between pockets defined between the layers by the discontinuous bonding pattern. These wraps have proven to be quite effective in keeping many types of sandwiches warm while avoiding soggy spots on the bun. In some cases however, especially for sandwiches containing large portions of meat or having multiple meat patties, these wraps may not be capable of absorbing all of the moisture given off by the patties, particularly if the sandwich is stored for several minutes longer than the usual holding time. In other cases, the buns or cheese may adhere to the absorbent inner layer detracting from the attractiveness of the products as either detached paper will need to be removed from the sandwich or portions of sandwich will detach and be scattered over the wrap. If the wrap does not retain all of the moisture given off by the sandwich, the bun may become easily deformed as a result of excess moisture absorbed. The sandwich wrap of the present invention provides greatly improved moisture control while decreasing adhesive tendencies between sandwich components and the absorbent inner layer by interposing a foraminous hydrophobic water-vapor-permeable pellicle on fibers positioned between the sandwich and the moisture-vapor-impermeable polymeric layer. Surprisingly, we have found that moisture control properties remain even if the entirety of absorbent portions of the wrap interior to the moisture-vapor-impermeable layer is provided with the foraminous-hydrophobic water-vapor-permeable pellicle. In preferred embodiments, highly absorbent materials are included in at least a portion of the absorbent layer between the pellicle bearing fibers and the water-vapor-impermeable film. We use the word "pellicle" to describe the "deposit" or "precipitate" left behind after hydrophobe precursor has been applied to fibers and the carrier removed. We chose the word "pellicle" because it has the connotation of being very thin and not necessarily continuous. As will be seen, release and hydrophobic properties can result from extremely thin pellicles which do not necessarily encompass the entirety of the surface of the fiber.

FIELD OF THE INVENTION

This invention relates to improved composite wrap materials, and more particularly to composite wrap materials used primarily for packaging hot foodstuffs as well as for similar hot finger foods such as tacos, burritos and the like, with the composite wrap providing an improved combination of heat retention, moisture control and masking of food staining, this combination of properties providing both improved appearance upon serving and unwrapping (usually termed "presentation") and palatability of sandwiches which may have been stored for somewhat over a quarter of an hour. The invention also relates to a method of making the improved composite wrap materials.

BACKGROUND OF THE INVENTION

Recently introduced composite wraps alleviate many of the grease and moisture control difficulties experienced with conventional commercial wraps such as polyethylene coated paper, hot melt coated paper, foil/tissue laminations, dry wax, and the like. These newer composite wraps (prepared according to pending U.S. patent application Ser. No. 07/372,165abandoned in favor of continuing application Ser. No. 07/759,717, now U.S. Pat. No. 5,128,182) largely overcome many moisture and grease control problems, especially for single patty hamburgers and cheeseburgers but in the case of sandwiches evolving particularly large amounts of steam or grease, a sacrifice of heat retention or storage time (holding period) could be required to avoid problems due to excessive moisture and grease evolved. Upon prolonged holding, especially large amounts of moisture are typically evolved from sandwiches having multiple patties or those containing portions which evolve especially large amounts of moisture, such as over about four ounces of hamburger or so. Thus, there is presently a need to develop a further improved composite wrap capable of transcending the aforementioned trade-off, bringing to larger sandwiches advantages that first generation composite products brought to the smaller. In addition, there is a need to develop a method of manufacturing these improved composite wrap materials.

SUMMARY OF THE INVENTION

The objects and advantages of the invention will be set forth in part in the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, there is disclosed:

A composite integral wrap material, including:

a first layer of absorbent material;

a second layer of printable material;

a water-vapor-impermeable polymer layer interdisposed between the first and second layers; and treated fibers in said first layer at least adjacent to the face thereof away from said water-vapor-impermeable polymeric layer, each treated fiber bearing a foraminous hydrophobic water-vapor-permeable pellicle, wherein at least one of the first and second layers is discontinuously bonded to a respective side of the polymer layer at spaced locations, so that at least one of the first and second layers forms air pockets with the polymer layer at locations between the bond locations. In a preferred embodiment, at least a portion of the first layer will also include highly absorbent material comprising the reaction product of in-situ crosslinking of water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in a one square foot sheet being sufficient to absorb at least 1 gram of water, There is also disclosed:

A process for making an integral composite wrap material having air pockets on at least one side of an impermeable polymer, including the steps of:

conveying an impermeable polymer to a location between a pair of nip rollers rotating in opposite directions;

directing a first layer of absorbent material to said nip rollers and adjacent to one side of the impermeable polymer, directing a second layer of a printable material to said nip rollers and adjacent to the other side of the impermeable polymer;

controlling the temperature of a surface of at least one of the pair of nip rollers, the other one of the pair of nip rollers having a surface with peripherally spaced protrusions extending therefrom for physical engagement with the first and second layers, the impermeable polymer, and the surface of at least one of the pair of nip rollers;

passing the first and second layers and the impermeable polymer between the pair of nip rollers to control the temperature of the impermeable polymer and to discontinuously bond at least one of the first and second layers to a respective side of the impermeable polymer at spaced locations to form air pockets with the impermeable polymer at locations between the bond locations;

providing a foraminous hydrophobic water-vapor-permeable pellicle upon at least fibers contained in said absorbent layer adjacent to the surface of said absorbent layer away from said water-vapor-impermeable polymer by spreading an effective amount of a hydrophobe-precursor on said absorbent layer and thereafter converting the hydrophobe-precursor to a foraminous hydrophobic moisture-vapor-permeable pellicle; and incorporating into at least a portion of said absorbent layer highly absorbent material comprising the reaction product of in-situ crosslinking of absorbent water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in a one square foot sheet being sufficient to absorb at least 1 gram of water.

The invention consists in the novel application of converting methods and products shown and described. The accompanying drawings, which are incorporated in and constitute a part of the specification, illustrate various aspects of the invention and, together with the description, serve to explain the principles of the invention.

DESCRIPTION OF THE PREFERRED EMBODIMENTS

The present invention is directed to a 3-ply composite wrap material for hot foodstuffs, having three layers: a first absorbent layer containing fibers bearing a foraminous hydrophobic water-vapor-permeable pellicle; a second printable layer; and a water-vapor-impermeable polymer layer interposed between the first and second layers. In preferred embodiments, at least a portion of the layer of absorbent material also comprises reaction product of in-situ crosslinking of water soluble polymer, said reaction product being water insoluble and exhibiting a water-retention capacity of at least about 10 grams of water per gram ("g/g") of reaction product, preferably over about 25 g/g and more preferably over about 50 g/g, the amount of reaction product present on an area basis being sufficient to absorb at least about 0.001, preferably 0.002, more preferably 0.0025 grams of water per square centimeter, and still more preferably over 0.005 g/cm$^2$, the total amount of reaction product in a one square foot sheet being sufficient to absorb at least 1 gram of water, preferably at least about 1.5 grams, more preferably over 2 grams, and in the most preferred embodiments, at least 3 grams of water. The invention also concerns the method of manufacturing the 3-ply wrap material.

Figure 1:
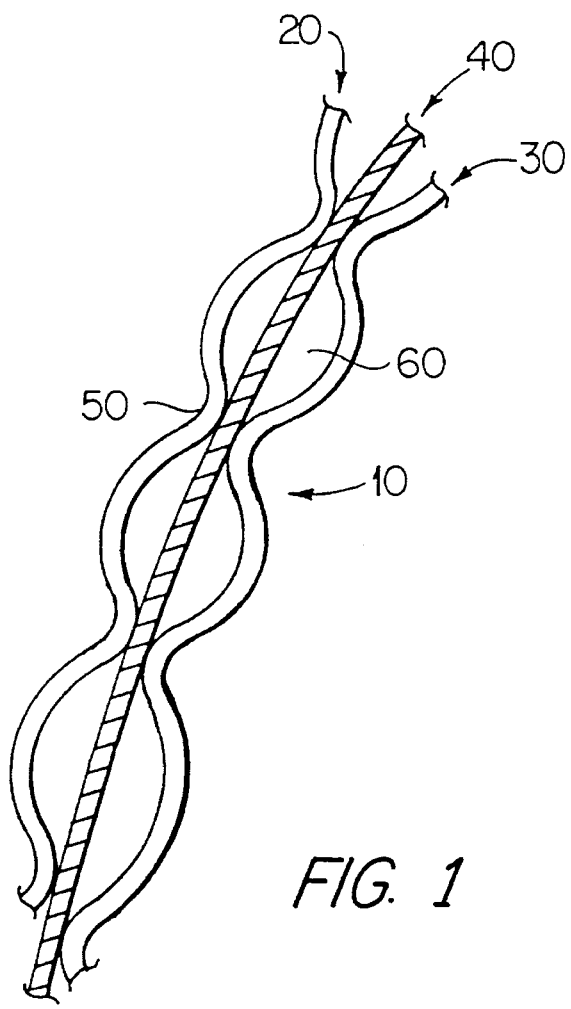
FIG. 1 is a cross sectional view of one embodiment of the composite wrap material according to the invention.
Figure 4:
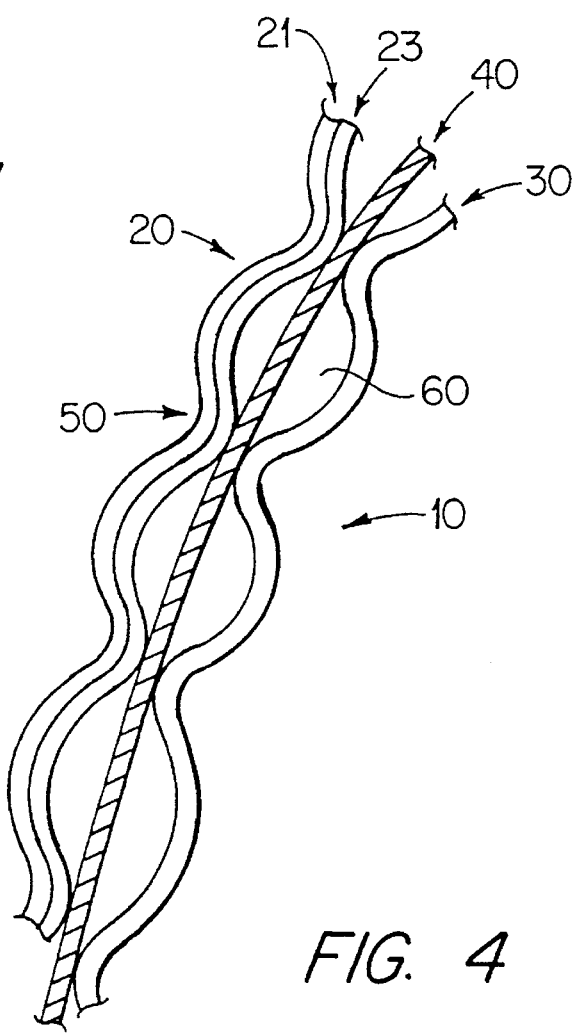
FIG. 4 is a cross sectional view of another embodiment of the composite wrap material according to the invention.

Referring to FIG. 1, and as embodied herein, there is shown generally 3-ply composite wrap material 10. The material 10 is made of first, absorbent layer 20, second, printable layer 30, and impermeable polymer layer 40 interposed between first layer 20 and second layer 30. First layer 20 and second layer 30 are discontinuously, or spot, bonded 50 to the respective opposite sides of layer 40 which is interposed therebetween to form air pockets 60. Fibers in layer 20 bear foraminous hydrophobic water-vapor-permeable pellicles formed by spreading hydrophobe-precursor over fibers in the absorbent layer and thereafter converting the precursor to foraminous hydrophobic water-vapor-permeable pellicles on the fibers, usually by removal of the aqueous carrier. The pellicle is applied to at least fibers adjacent to the surface of the absorbent layer opposite water-vapor-impermeable layer 40 and adjacent to the hot foodstuff. On the other side of layer 20 is impermeable polymer layer 40. After water vapor passes into layer 20, it appears that it either condenses on impermeable polymer layer 40 and is trapped adjacent thereto or that some portion of the vapor and, possibly, the condensed water, enters fibers in layer 20 through the pellicle and is absorbed there. Surprisingly, even if substantially all of the fibers in layer 20 are treated, the wrap continues to have the ability to retain or absorb moisture from the hot foodstuff, as well as any grease which may be present. The pellicle may be present on fibers in a distinct sublayer as indicated in FIG. 4 or it may be present as a film, coating or crust on at least some, and surprisingly even possibly all, of the fibers in layer 20. Surprisingly, we have found that absorbent layer 20 is capable of retaining substantial amounts of moisture, even if hydrophobe precursor penetrates absorbent layer 20 to such a depth that both surfaces thereof are rendered hydrophobic. It is not known whether moisture may be predominately trapped between impermeable film 40 and absorbent layer 20 or is absorbed within individual fibers in absorbent layer 20. Preliminary indications are that some moisture is probably retained by each mechanism for, when a sheet is exposed to steam and subsequently delaminated, absorbent layer 20 assumes a more highly translucent character which is deemed to be an indication that moisture has been absorbed by individual fibers while residual droplets of water can be seen on impermeable film 40.

As embodied herein, absorbent layer 20 has both good fold retention and good water retention capacity. The basis weight preferably ranges from 5 to 50 lbs/3,000 sq. ft., and more preferably from 10 to 20 lbs/3,000 sq. ft. To avoid sogginess, the basis weight and water retention capacity of absorbent layer 20 should be such that it can retain virtually all the water vapor expected to be lost by the hot sandwich and condensed on impermeable layer 40 during the anticipated holding period. In preferred embodiments, at least a portion of layer 20 includes absorbent material comprising the reaction product of in-situ crosslinking of absorbent water soluble polymer, said reaction product being water insoluble and exhibiting a water-retention capacity of at least about 10 grams of water per gram of reaction product, preferably over 25 g/g and, more preferably, over 50 g/g; the amount of reaction product present on an area basis being sufficient to absorb at least about 0.001 grams of water per square centimeter, more preferably over 0.0025 g/cm$^2$ and most preferably over 0.005g/cm$^2$, the total amount of reaction product in a one square foot sheet being sufficient to absorb at least 1 gram of water, preferably over 1.5 grams, more preferably, over 2 grams and, in the most preferred embodiments, at least 3 but no more than about 5 grams of water. Layer 20 may be almost entirely comprised of reaction product, save only sublayer 21 comprising fibers bearing thin foraminous hydrophobic water-vapor-permeable pellicles present on the surface of individual fibers in sublayer 21; or alternatively, reaction product may be dispersed through layer 20 and separated from the foodstuff by a layer of more conventional absorbent material comprising cellulosic fibers having a water retention capability of less than about 0.1 grams of water per gram of fiber; or reaction product may be present as distinct sublayer 23, interior to portions of the wrap comprising both fiber bearing pellicles and fibers without. Reaction product may also be present in a pattern conforming to expected locations of moisture evolution in a wrapped foodstuff.

According to a preferred embodiment of the invention, absorbent layer 20 comprises a layer of material comprising two sublayers, sublayer 21 comprised primarily of cellulosic fibers rendered hydrophobic by application of a hydrophobe precursor and sublayer 23 comprising primarily absorbent material comprising the reaction product of in-situ crosslinking of absorbent water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in a one square foot sheet being sufficient to absorb at least 1 gram of water. Materials for use as the absorbent sublayer 21 are preferably selected from the group of cellulosic materials consisting of nonwoven tissue, air laid fabric, wet laid tissue, wet or dry creped tissue and embossed papers, treated as described below.

In accordance with the invention, printable layer 30 is positioned adjacent to the side of impermeable polymer layer 40 away from the hot foodstuff and is used for printing of identifying symbols, marks, labels or other indicia of source. Printable layer 30 preferably has good fold retention with a basis weight ranging from 10 to 50 lbs/3,000 sq. ft., and more preferably ranging from 10 to 25 lbs/3,000 sq. ft.

As embodied herein, printable layer 30 may be any material having a printable surface, such as a coated paper. Typically, one surface of printable layer 30 has a smoother, glazed surface. Materials capable of use as printable layer 30 may be selected from the group of materials consisting of machine finished, machine glazed papers and coated papers.

In accordance with the objects and advantages of the invention, the densities of printable layer 30 and absorbent layer 20 of composite wrap 10 may be varied to control the heat flux through composite wrap 10 and the absorbency of layer 20. When absorbent layer 20 has a high density, the radiation of heat away from the hot foodstuff is minimized because the absorbent layer reflects and attenuates the radiant heat energy given off by the sandwich. The lower density printable layer 30 has a low thermal conductivity which, in combination with air pockets 60, reduces heat transfer from the higher density layer to the environment.

According to the invention, impermeable layer 40 is interposed between first and second layers 20 and 30, respectively. Layer 40 acts as a condensation surface for water vapor. Absorbent layer 20 then retains the condensate and grease to keep the hot foodstuff from becoming soggy and unpalatable. More importantly, by preventing the passage of water vapor, layer 40 facilitates heat retention by the hot foodstuff by retaining the heat from the condensed vapor within the package. By condensing the water vapor lost by the hot sandwich, the heat in that vapor is recovered within the sandwich wrap. This recovered heat lessens subsequent heat loss by the sandwich, thereby improving sandwich temperature during holding. By preventing the passage of grease, layer 40 also helps to prevent unsightly grease stains on the outside of composite wrap material 10. Coupling the highly absorbent material in sublayer 23 with impermeable layer 40 makes it possible to retain sandwiches in palatable condition at acceptable serving temperature for considerably longer periods, often several minutes longer, than with composite wraps not incorporating highly absorbent materials. Layer 23 is preferably spaced away from the hot foodstuff to prevent direct contact therewith. The separation may be provided by a layer of paper having a water holding capacity of less than 1 g/g or, more advantageously, by a distinct sublayer 21 comprising primarily fibers bearing hydrophobic pellicles. Combination of layer 23 with layer 21 of fibers bearing foraminous hydrophobic water-vaporpermeable pellicles provides improved retention of appearance of the sandwich especially providing appetizing presentation even after rather prolonged storage.

Impermeable polymers useful in accordance with this invention include any extrudable material which can act as a complete barrier, e.g., is impermeable to water vapor and grease, such as polyethylene. Polymer materials useful in accordance with the invention are preferably selected from the group of polymers consisting of wax/polymer blends, polyethylene, polyvinylidene chloride, ethylene acrylic acid copolymer, polypropylene, polyester, polyisobutylene, nylon, polymethylpentene, ethylene vinyl acetate and hot melts.

As further embodied herein, the polymer material may be pigmented. This pigmentation serves to give opacity to the polymer material to mask stains created by the grease and condensate absorbed by absorbent layer 20, as well as any grease or condensation which may be present on layer 40. The opaque quality of the polymer material helps to improve the aesthetic qualities of the wrapped food product by masking any grease and water stains.

Pigments which may be mixed with the polymer material to provide opacity include any metallic oxide pigments and any organic dye colorants. Pigments useful in accordance with the invention are preferably selected from the group consisting of titanium dioxide, calcium carbonate and zinc oxide.

The pigments can be mixed with the polymer material according to any well known method prior to extruding or forming pigmented polymer layer 40.

Perhaps the most convenient method of forming foraminous hydrophobic water-vapor-permeable pellicle is to simply spread a very thin, superficial interspersion of a hydrophobe precursor over a paper sheet in an amount small enough to avoid formation of a continuous film but large enough to prevent penetration of the sheet by droplets of water. In a very broad sense, coating materials that provide a low surface energy surface and do not form continuous films are useful release coatings for hot sandwich packaging applications. Typically, upon conversion, suitable hydrophobe precursor materials will produce a porous or microporous hydrophobic surface having a surface energy of less than 35 dynes/cm when applied to fibers on the surface of the inner absorbent layer. Included in this category are, for example, silicones, fluorocarbons, waxes, and fats. The foraminous nature of the pellicle seems to possibly stem from a variety of causes: from porosity in the layer of hydrophobe formed on the individual fibers; from gaps between fibers; from incomplete contact between the surface of the fiber and the hydrophobe; or combinations of these. Usually, the hydrophobe will be applied so sparingly that gaps between fibers are not bridged over by the hydrophobe. Preferably, the hydrophobe precursor is applied as an aqueous admixture prior to provision of the highly absorbent material to avoid the requirement of removing water from the highly absorbent material. Preferably, the sequence of steps will provide for formation of the highly absorbent material by in-situ crosslinking only after all other significant drying procedures are substantially complete.

Broadly speaking, a hydrophobe precursor may be any organic material combining a site reactive toward starch or cellulose with a long hydrophobic tail such as, for example, a $C_{14}$–$C_{18}$ carbon chain length tail. Materials like fatty acids, fatty acid amides, and fatty alcohols fall into this category. Suitably reactive natural and synthetic polymeric materials with pendant hydrocarbon groups along their backbone will also provide the necessary hydrophobicity. Hydrophobically modified starches and latices are examples of this group of materials. Hydrophobically modified polyvinyl acetate with a short hydrocarbon tail also can provide release under many circumstances.

Precursors can be any material having long chain molecules bearing pendant groups like methyl, trifluoromethyl, or difluoromethyl along its backbone providing low surface energy and, consequently, a level of release sufficient for this application. A more comprehensive list of pendant groups and their effect on surface energy are shown below:

| Pendant Group | Surface Energy (dynes/cm$^2$) |
| --- | --- |
| —$CF_3$ | 6 |
| —$CF_2H$ | 15 |
| —$CF_3$ and —$CF_2$— | 17 |
| —$CF_2$— | 18 |
| —$CH_2$—$CF_3$ | 20 |
| —$CF_2$—$CFH$— | 22 |
| —$CF_2$—$CH_2$ | 25 |
| —$CFH$—$CH_2$ | 28 |
| —$CH_3$ | 22 |

Typical hydrophobe precursors will have a structure represented as:

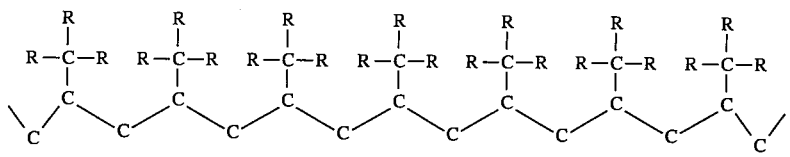

where R is selected from the following: hydrogen, alkyl groups, halogenated alkyl groups and halogens or a combination thereof.

Preferred hydrophobe precursors will have structures represented as structures I–III below:

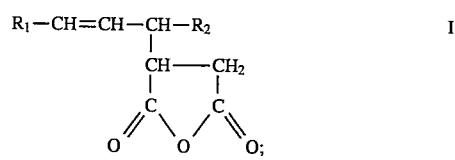   I

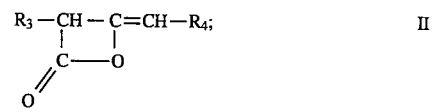   II

-continued

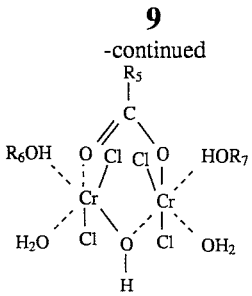

III wherein $R_{1-5}$ are long chain ($C_{12+}$) alkyl groups, and $R_6$ and $R_7$ are lower ($C_{1-4}$) alkyl groups. Preferably, $R_{1-5}$ are at least $C_{16}$ groups while $R_{6-7}$ are methyl, ethyl or propyl groups. More preferably, $R_{1-2}$ are $C_{18}$ groups, $R_{3-4}$ are $C_{16-18}$ groups, $R_5$ is $C_{18-19}$ and $R_{6-7}$ are propyl groups. The preferred hydrophobe precursors include: Alkyl ketene dimers (AKD's) such as HERCON 70 from Hercules, Inc.; alkenyl succinic anhydride (ASA), from American Cyanamid and Quilon, a Werner complex from du Pont. These precursors are morphologically similar but react with carbohydrates like starch and cellulose in a different way. HERCON 70, for example, seems to become substantive through a lactone ring opening reaction, while the alkenyl succinic anhydride appears to become substantive via an anhydride opening reaction. Quilon is thought to become substantive by a Werner Chrome complex reaction mechanism. Each of the more preferred materials have a $C_{14}$–$C_{18}$ carbon length tail providing hydrophobicity and release. Orientation of these hydrocarbon tails toward the air interface is thought to provide the low surface energy and release behavior.

The most preferred release coatings for a hot sandwich wrap provide easy release, breathability, and low cost. These coatings can be thought of as abhesives as they prevent sticky adhesive-like materials from bonding to the surface to which they are applied. Alkyl ketene dimers (AKD's) such as HERCON 70 from Hercules Inc. are the most preferred precursors providing excellent release performance. This material can be incorporated into a size press formulation along with a starch like PENFORD 250, a viscosifier like KELGIN MV, and a defoamer like NALCO 8669, then applied on a paper machine size press at 4.5% solids, yielding a breathable foraminous water-vapor-permeable hydrophobic surface with only 0.25 lb/3000 ft² ream of coat weight. This hydrophobic surface treatment augments release while also providing the required vapor permeability to allow free movement of water vapor through it. Further, being a hydrophobe, this coating inhibits redeposition of condensed water onto the hot sandwich.

These formulations can be applied using any of the numerous conventional coating equipment encountered in the paper industry, for example: the size press on a paper machine, an on-line coater, or an off-line coater, and the like. For most applications, an on-line operation will, of course, be preferred if equipment and space permit, but any of the coating operations described can be successfully used. The design of the size press is not critical to performance so it can be of a horizontal, vertical, or inclined configuration. A metering size press of any of the well-known designs also will provide acceptable performance. An on-line coater of a common design known to those skilled in the art capable of handling the above formulations also can be used. Off-line coaters, while possibly not economically as attractive as an on-line coater for many applications, will provide acceptable performance. Any of the common designs, such as rod, gravure, knife, and the like, can be used. A specific example of a size press formulation that successfully provides the functions described above is shown as Example 1:

EXAMPLE 1

| PENFORD 250 | 88 lb |
|---|---|
| KELGIN MV | 6 lb |
| HERCON 70 | 6 lb |
| Water | 2122 lb |

Other useful formulations are shown as Examples 2 and 3.

EXAMPLE 2

| NATIONAL 78-1725 | 74.5 lb |
|---|---|
| KELGIN MW | 10.0 lb |
| HERCON 70 | 75.5 lb |
| Water | 2841.0 lb |

EXAMPLE 3

| PENFORD 260 | 78.2 lb |
|---|---|
| KENGIN MW | 6.3 lb |
| HERCON 70 | 15.5 lb |
| Water | 1567.0 lb |

If the amount of moisture evolved by a sandwich exceeds the capacity of the wrap to retain moisture, the sheet can become soggy and provide an undesirably wet surface against the sandwich. Even though the previously mentioned composites are capable of retaining considerably over a gram of water, not all of this moisture is physically absorbed by the absorbent layer which can usually absorb less than its weight in moisture, so a typical square 12" 10¾ lb. sheet[1] could allow moisture to undesirably be transferred back to the bun, or otherwise provide a less than ideal surface for contact with bread before even a full gram of moisture was evolved form the sandwich. We have found that a sandwich containing only four ounces of typical hamburger will often evolve over two grams of water during a prolonged holding time. Such large amounts of water vapor condensed on the barrier layer can saturate a 10¾ lb inner layer and surpass the ability of the wrap to retain moisture allowing redeposition of water on the sandwich, resulting, in some cases, in a less attractive presentation or, in extreme cases, in a soggy and unpalatable bun. Thus, by incorporating a highly absorbent material into the inner absorbent layer, we can provide for satisfactory presentation over retention times increased beyond that of the above described composite wraps. In accordance with the present invention, absorbency of the inner ply of a multilayer paper-based hot sandwich wrap is enhanced by incorporating highly absorbent materials into the absorbent layer in order to enhance the water-holding properties of the hot sandwich wrap. The most preferred highly absorbent materials are those that are created in-situ by crosslinking absorbent water-soluble polymers. Such a system can be made by incompletely crosslinking almost any water soluble carboxyl-group-containing polymer to such a degree that it becomes insoluble but numerous carboxyl groups remain unreacted. The specific chemistries usable in formation of such highly absorbent materials are well known and those preferred for use herein may be summarized as follows:

[1](Throughout this specification, where the weight of a sheet is set forth in pounds, it is to be understood that weight is the weight of a 3,000 square foot ream)

Suitable highly absorbent materials comprise an ionic complex of two essential ingredients: a water-soluble anionic polyelectrolyte, and a polyvalent metal cation. The poly-electrolyte can be a natural or synthetic polymer characterized by substantial water-solubility in an aqueous medium of some relatively neutral pH (somewhere from 2.0 to 8.5 pH) and by the presence of anionic groups (preferably carboxyl, sulfonate, sulfate or phosphate anionic groups). The preferred natural polymers are the anionic derivatives of starch or cellulose, and the preferred synthetic polymers are the carboxylic acid homopolymers or copolymers containing at least 20 mole percent carboxylic acid units, e.g., polyacrylic acid.

Exemplary of the carboxylic acid-containing polyelectrolytes are the synthetic copolymers of ethylenically unsaturated monomers with mono-ethylenically unsaturated carboxylic acids or their partially neutralized salts. Examples of the preferred $\alpha,\beta$-mono-unsaturated carboxylic acids include acrylic acid, methacrylic acid, maleic acid, maleic anhydride, itaconic acid, itaconic anhydride, fumaric acid, half esters or half amides of maleic, fumaric and itaconic acid, crotonic acid, etc. Examples of the preferred $\alpha,\beta$-ethylenically unsaturated monomers include acrylamide or methacrylamide and their N and N,N dialkyl derivatives containing 1–18 carbon alkyl groups, alkyl acrylates and methacrylates containing 1–18 carbon alkyl groups, vinyl esters, vinyl aromatic compounds, dienes, etc.

Homopolymers of monoethylenically unsaturated carboxylic acids or mixtures of these monomers may also be used. Examples include acrylic and methacrylic acid homopolymers and acrylic acid/methacrylic acid copolymers.

Exemplary of the sulfonic acid-containing polyelectrolytes are the homopolymers of monoethylenically unsaturated sulfonic acids (or salts thereof) and copolymers thereof with the aforementioned ethylenically unsaturated monomers. Suitable sulfonate-containing monomers include aromatic sulfonic acids (such as styrene sulfonic acids, 2-vinyl-3-bromobenzenesulfonic acid, 2-vinyl-4-ethylbenzenesulfonic acid, 2-allylbenzene sulfonic acid, vinylphenylmethane-sulfonic acid and 1-sulfo-3-vinylphenylmethane sulfonic acid), heterocyclic sulfonic acids (such as 2-sulfo-4-vinylfurane and 2-sulfo-5-allylfurane), aliphatic sulfonic acids (such as ethylenesulfonic acid and 1-phenylethylene sulfonic acid), sulfonic acids containing more than a single acid radical (such as $\alpha$-sulfoacrylic acid and $\alpha$-sulfoethylene-sulfonic acid), and sulfonic acid derivatives hydrolizable to the acid form (such as alkenyl sulfonic acid compounds and sulfoalkylacrylate compounds).

Exemplary of the sulfate-containing polyelectrolytes are those formed by reacting homopolymers and copolymers containing hydroxyl groups or residual polymer unsaturation with sulfur trioxide or sulfuric acid; for example, sulfated polyvinyl alcohol, sulfated hydroxyethyl acrylate, sulfated hydroxypropyl methacrylate. Exemplary of the phosphate-containing poly-electrolytes are the homopolymers and copolymers of ethylenically unsaturated monomers containing a phosphoric acid moiety, such as methacryloxy ethyl phosphate.

Exemplary of the poly-electrolytes formed of natural polymers and their derivatives are the carboxylated, sulfonated, sulfated, and phosphated derivatives of cellulose and starch, such as carboxymethyl cellulose and carboxymethyl starch. Naturally occurring anionic poly-electrolytes such as alginates, carrageenen, proteins (such as gelatin, casein, and soya protein), gum arabic, algin, agar, gum ghatti also have utility.

The polymers may be prepared by conventional polymerization techniques, such as solution, emulsion, suspension, and precipitation polymerization techniques. While the polymers are preferably prepared using a free radical polymerization mechanism, other polymerization mechanisms, including anionic and cationic mechanisms, may be used.

The poly-electrolyte generally has a molecular weight of from 10,000 to 10,000,000. Absorbency of the composition is improved when the poly-electrolyte is at higher molecular weight levels within the specified range. Accordingly, various di-functional monomers such as allyl methacrylate may be used to chain extend the poly-electrolyte prior to exposure to the cation. The amount of chain extender used must, of course, not render the poly-electrolyte insoluble in aqueous media. The increased chain length of the poly-electrolyte permits lower cation crosslinker levels to be employed as there are fewer polymer chains to be complexed.

Absorbency of the composition is improved when the poly-electrolyte has up to about 95%, preferably 40–85% of its anionic groups neutralized with a suitable base such as an alkali metal hydroxide, a primary, secondary or tertiary amine, etc. The neutralization is thought to uncoil and straighten out the polymer chains in contact with water so that the final complex is more swellable in the presence of water.

The polyvalent metal cation complexes the above described poly-electrolyte to render the overall polymer composite substantially insoluble yet highly swellable. The cations have a valence of at least three and are cations of metals belonging to the following groups of the periodic table: IIIB, IVB, VB, VIB, VIIB, VIII, IIIA, IVA, VA, VIA. The preferred metals are aluminum, zirconium, chromium, titanium and iron, and to a lesser degree antimony and bismuth. More preferred metals are zirconium, aluminum, iron, titanium and mixtures thereof. For our purposes, zirconium is an especially preferred metal.

The metal compound can be added prior to, during polymerization or post-added to a polymeric poly-electrolyte solution, the only restraint being that the metal compound be at least ionizable or soluble in the polymer system. The polyvalent metal can be added to the composition by means of a basic, acidic or neutral salt, hydroxide, oxide or other compound or complex which has at least limited solubility in water or an organic solvent in which the poly-electrolyte and/or its constituent monomers are also soluble at the time of cation introduction.

Examples of inorganic salts include chlorides, nitrates, sulfates, borates, bromides, iodines, fluorides, nitrites, perchlorates, phosphates, and sulfides, such as aluminum chloride, aluminum sulfate, ferric sulfate, ferric nitrate, antimony trichloride, bismuth chloride, zirconium chloride, chromic sulfate, and chromic nitrate. Examples of organic salts include salts of carboxylic acids such as carbonates, formates, acetates, butyrates, hexanoates, adipates, citrates, lactates, oxalates, oleates, propionates, salicylates, glycinates, glycollates and tartrates; for example, aluminum formoacetate, basic aluminum acetate, chromic acetate, aluminum citrate, aluminum diformate, aluminum triformate, titanium oxalate, ferric acetate, aluminum octate, ferric oleate, zirconium lactate and zirconium acetate.

The ammonia and amine complexes (and especially those coordinated with ammonia) of these metals are particularly useful. Amines capable of so complexing include morpholine, monoethanol amine, diethylaminoethanol and ethylenediamine. Examples of these amine complexes include ammonium zirconyl carbonate, ammonium zirconyl glycinate, and ammonium zirconium chelate of nitrilotriacetic acid. Polyvalent metal complexes (salts) of organic acids that are capable of solubilization in an alkaline pH range may also be employed. Such anions as acetate, glutamate, formate, carbonate, salicylate, glycollate, octoate, benzoate, gluconate, oxalate and lactate are satisfactory. Polyvalent metal chelates wherein the ligand is a bidentate amino acid, such as glycine or alanine, are particularly useful.

Other organic compounds containing polyvalent metals are also useful; for example, the metal alkoxides, metal alkyls, and acetyl acetonates, such as aluminum isopropoxide, titanium acetyl acetonate, aluminum acetyl acetonate, chromic acetyl acetonate, zirconium ethoxide, chromic isobutoxide and triethyl aluminum.

The cations of one or more of such metals are present in the highly absorbent material at a level of 0.01–5.0 milliequivalents of cation per gram of poly-electrolyte, and preferably 0.1–1.0 milliequivalents of cation per gram of poly-electrolyte. Lower cation levels do not render the polymeric composition water-insoluble, while higher cation levels render the polymer composition not only water-insoluble, but also non-swellable.

Lower cation levels within the range are especially effective when the poly-electrolyte is of relatively high molecular weight. Regardless of pH, higher cation levels within the specified range contribute to the permanency of the gel formed by exposure of the dried complex to the fluid to be absorbed; but it is noted that, in this application a gel life of only a fraction of an hour, typically well under 45 minutes, is required and hence lower cations levels within the specified range may be suitable. In general, the optimum cation level varies with the ion size of the cation.

Not all of the available ionic linkages of a given polyvalent cation will necessarily be associated with different poly-electrolyte polymeric chains, especially in the case of the cations such as zirconium, having valence or oxidation states greater than 3, inner salt formation (that is, the attachment of a single cation exclusively to a single-polymer chain or to a number of polymer chains less than the valence) will occur to an unspecified degree dependent on the spatial geometries presented by the reagents involved, relative concentrations, etc. Light-to-moderate complexing of the water soluble poly-electrolyte renders the material water insoluble, but water-swellable. In the presence of a quantity of water, the highly absorbent material becomes a gelatinous agglomerate of liquid-swollen particulate members. The material is capable of absorbing at least 10 times its weight in water, and generally at least 20 times its weight. Furthermore, the composition is capable of retaining the absorbed water even when exposed to pressure sufficient to deform the agglomerate, and generally up to pressures of about 2.5 psi, such as would be encountered in a wrapped sandwich.

The poly-electrolytes used in practice of the present invention should be substantially water-soluble at some pH between 2.0 and 8.5 to utilize the metal complexing and form the desired water-insoluble absorbent complex. However, the reversibility of ionic complexing (as opposed to covalent bonding) is well known in the chemical art and once the pH of the complex is raised above a certain level (i.e., the pH of reversibility), the complex breaks down, yielding again the water-soluble non-absorbent poly-electrolyte. This reversibility of complex formation facilitates easy and economical application of the complex onto a desired substrate by use of conventional fluid application techniques as described above with relation to application of the hydrophobe precursor. Prior to application, a suitable quantity of a base is added to the complex to cause dissolution thereof into a solution containing the cation and the water-soluble poly-electrolyte thereof, and subsequent to application, an acid is added to the solution to cause reformation of the absorbent complex. In a preferred technique, a volatile base (such as ammonium hydroxide) is employed to break the complex so that mere drying of the solution suffices to lower the pH and hence cause reformation of the absorbent complex without the addition of an acid. The acid strength of the polyelectrolyte acid has a marked effect upon the pH of reversibility. The higher the acid strength (i.e., the lower the pH of dissociation), the lower the pH of reversibility. For example, polyacrylic acid, a weak polymeric acid, reverses its complex at pH 8.5–9.0; whereas styrene sulfonic acid, a very strong polymeric acid, reverses its complex at a pH of about 3.5–5.0.

We particularly prefer partially pre-neutralized polyacrylic acid cross-linked with ammonium zirconium carbonate. Systems made in this fashion offer a wide range of absorbency depending on the amount of pre-neutralization with base, such as sodium hydroxide. A major advantage of these systems is that they do not become highly absorbent until they are dried. This eliminates the high thermal energy needed to dry water out of highly absorbent materials. In accordance with pending U.S. application Ser. No. 07/635,378, incorporated herein by reference, polyhydroxylates such as polysaccharides, sugars, particularly sucrose, monosaccharides, as well as polyvinyl alcohol can be used as extenders for the highly absorbent material. As mentioned previously, it is extremely advantageous to postpone conversion of these materials to the highly absorbent form until after the hydrophobe precursor, if used, is dried and other drying steps have been completed.

A description of the specific formulation is shown in Example 4. As mentioned, the precursors for the highly absorbent materials to be formed in-situ can be applied by any convenient technique, such as spraying or coating, the method chosen being based on equipment availability, viscosity of the precursor containing admixture, and the amount required. A size press or coater can be used on the paper machine making the base sheet which is to become the inner absorbent layer. An off-line coater equipped with a gravure, rod, knife, or blade coating head can also be used successfully. The system can also be applied by spraying in-line with one of the converting steps. As an example, the precursor could be sprayed on the 10¾ lb/3000 ft$^2$ web and dried in-line with the barrier extrusion lamination process. We have found that the polyacrylic acid salts are good adhesives and do not inhibit adhesion.

EXAMPLE 4

Acumer 1530 (237 pounds @ 25% solids, formerly marketed as ACRYSOL A-3, Rohm and Haas Corp.) was placed in a 55 gallon barrel. Dilution water (20 gallons) was added along with sodium hydroxide (16.5 pounds of solid pellets, added with stirring in two approximately equal portions over a four-hour period). After the sodium hydroxide had dissolved, ammonium hydroxide (15 pounds, approximately 34% ammonia in water) was added. After thorough mixing and after the mixture had cooled to room temperature, sodium bicarbonate (7.4 pounds, solid) was added cautiously with stirring. After the solids dissolved, ammonium hydroxide (1.0 pound) and ammonium carbonate (2.0 pounds, solid) were added followed by ammonium zirconium carbonate (2.9 pounds of solution, nominally 20% solids, Magnesium Elektron Corp.).

TABLE 3

Absorbent Classification
Preferred Polyelectrolytes
Raw Material

| Starch-based | Cellulose-based | Synthetics (PAA) |
| --- | --- | --- |
| Henkel: | Hercules: | Arakawa: |
| (Sold License) Grain Processing | (AQUALON) | (ARASORB) |
| Sanyo Chem: | J&J: | Dow Chemical: |
| SANWET Celanese Licensee | (GCC) Grafted Cellulose Copolymers | (XU) Experimental |
| Avebe: | | American Colloid: |
| (FOXSORB) Potato Starch | | (ARIDALL) |

Other highly absorbent materials can be created in-situ by selecting polymer and crosslinker systems as described in Ganslaw, U.S. Pat. No. 3,925,288. Conventional dry powder absorbents as shown in Table 1 can also be used even though these systems are somewhat more difficult to handle. For example, dry powder absorbents can be embedded between the absorbent layer and the impermeable layer using conventional technology.

According to one embodiment of the invention, there are a plurality of air pockets 60 formed on at least one side of the impermeable polymer layer 40 between discontinuous or spot bonded portions 50 of the absorbent layer 20 and printable layer 30 adjacent the respective sides of the layer 40. The air pockets 60 serve to insulate the hot foodstuff item by improving heat retention by decreasing conductive heat transfer. As shown in FIG. 1, air pockets 60 are formed on both sides of impermeable polymer layer 40.

Air pockets 60 may have a variety of shapes or pattern configurations; no one shape or pattern is preferred according to the present invention. The size and shape of air pockets 60 can be determined by aesthetic considerations. In general, the individual air pockets have a surface area ranging from 0.5 in² to 3.5 in².

The size of the air pocket is limited, for example, by the pattern depth of roll 90, discussed below, the temperature of extrudate 70 during production and the amount of compression that composite wrap 10 will be subjected to during packing or storage.

Figure 2:
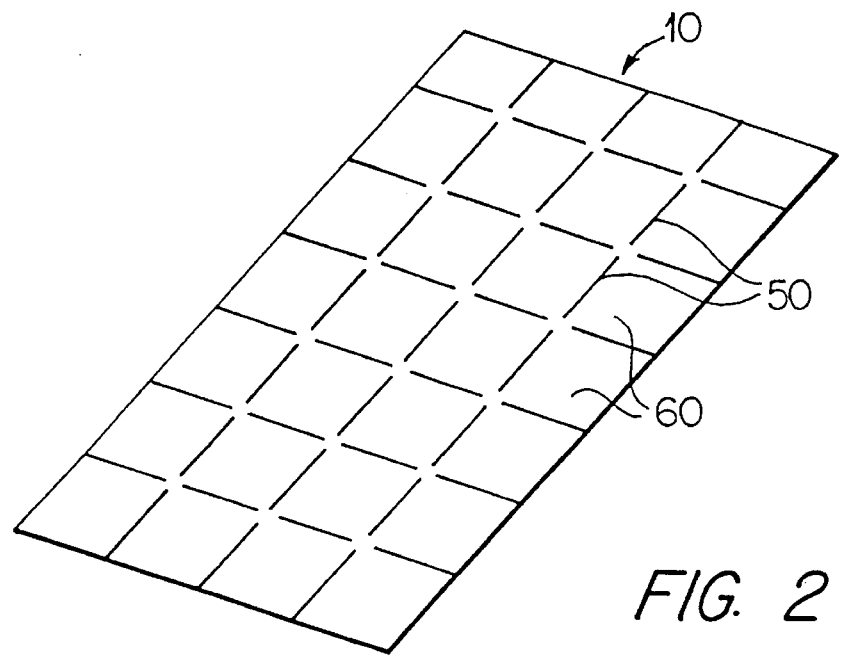
FIG. 2 is a perspective of the top surface of one embodiment of the composite wrap material according to the invention.

In accordance with the invention, and as shown in FIG. 2 for illustration purposes, the spot bonding creates a rectangular pattern in wrap material 10. None of the individual spot bonds are connected, resulting in a pattern whereby all of air pockets 60 are interconnected. Thus, the air contained in any individual pocket 60 can move throughout composite wrap material 10. This allows for an effective amount of air to be trapped between the layers of the composite wrap while reducing the chance of popping or blowing holes in any of the three layers when the finished composite wrap is tightly compressed during packing or storage.

According to one preferred embodiment, composite wrap material 10 is used in sheet form to wrap hot foodstuffs.

In another preferred embodiment, composite wrap material may be formed into pouches for wrapping hot sandwiches. The pouches may be manufactured according to any well known method.

In still another preferred embodiment, the composite wrap material may be formed into a bag in which the hot foodstuff can be placed. The bags may be manufactured according to any well known method.

In yet another embodiment, the wrap may be laminated to paperboard to protect the sandwich from physical deformation, such as, for example, a lining laminated to paperboard used to form a paperboard clamshell or other protective shape. Alternatively, it can be used for box liners.

Furthermore, a skilled artisan will recognize that "pouches" generally means an enclosure sealed on two of four sides, while a "bag" is an enclosure sealed on three of four sides.

Further in accordance with the invention, there is disclosed a method of manufacturing the 3-ply, composite wrap material 10 of the invention by extrusion lamination. With specific reference to FIG. 3, the preferred method will be described in detail below.

Figure 3:
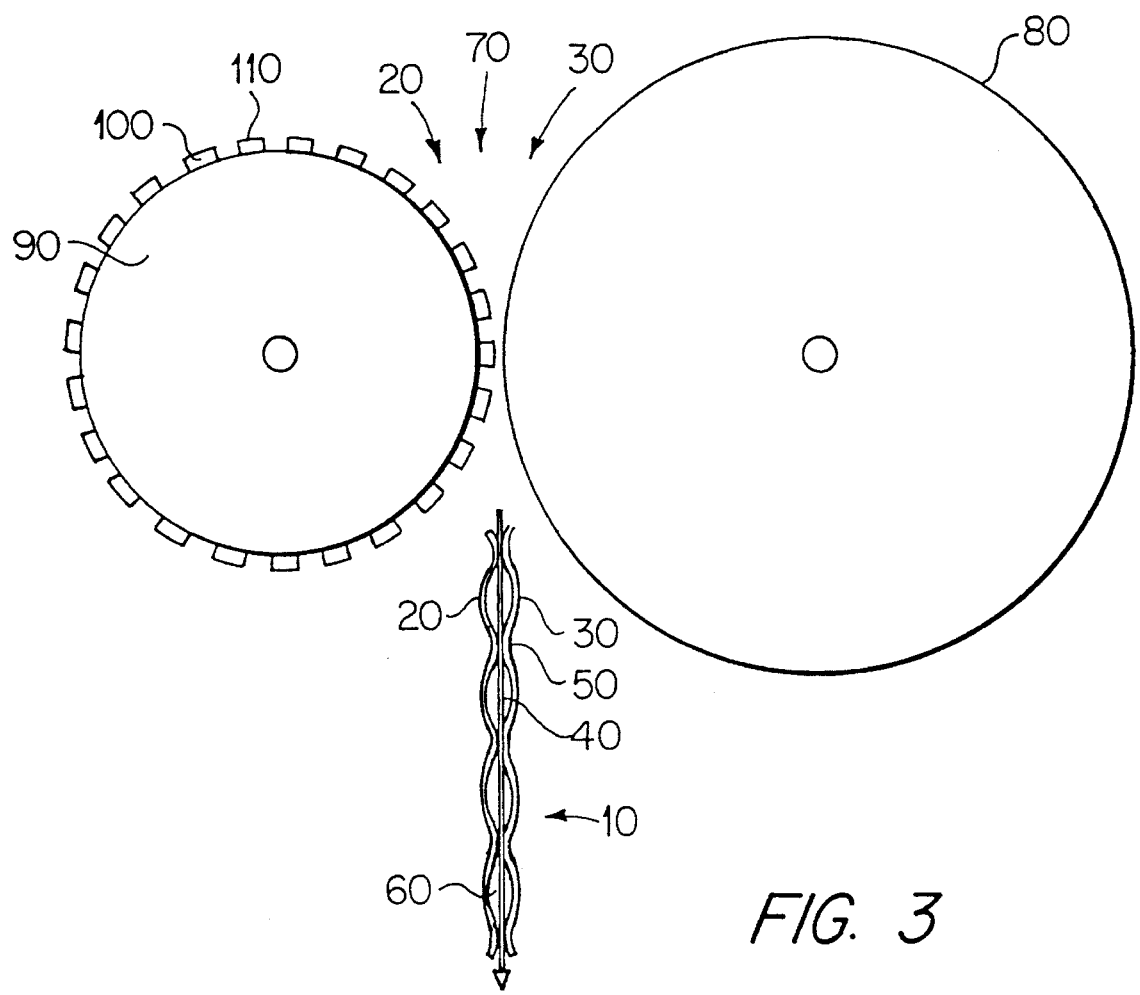
FIG. 3 is a schematic view of an apparatus used to produce the composite wrap material according to the invention.

The extrusion lamination process of making 3-ply, composite wrap material 10 is schematically shown in FIG. 3. Impermeable pigmented polymer extrudate 70, which when chilled sets to form impermeable polymer layer 40, is conveyed towards a pair of nip rolls 80, 90. Extrudate 70 may be formed and conveyed by any known method.

In accordance with the invention, extrudate 70 is generally at a temperature in the range of about 450° to about 600° F., and more preferably, about 500° to 550° F. prior to contact with at least one of the nip rollers.

Because layer 40 is impermeable, extrudate 70 should be extruded as a pinhole free film at a thickness sufficient to be able, when cooled, to form an impermeable barrier. Although some pinholing may occur as a result of paper fibers penetrating through the polymer film when the polymer film contacts layers 20 and 30, the amount of pinholing should be minimized to reduce water vapor loss, and hence heat loss.

First and second layers 20 and 30, respectively, are directed by any well known means into an adjacent, non-contact position with extrudate 70 on its respective opposite sides prior to passing through nip rolls 80, 90. The layers contact for the first time as they pass through nip rolls 80, 90 to form a three-layered material.

In accordance with the invention, at least one of rollers 80, 90 is cooled to a temperature sufficient to cool and set extrudate 70 when it indirectly contacts the roller through either absorbent layer 20 or printable layer 30 to form impermeable polymer layer 40. Typically, as shown in FIG. 3, smooth surfaced roller 80 is the roller whose surface temperature is controlled by any well known means. The temperature of roller 80 can vary according to the temperature of the extrudate and expected time of contact. According to the invention, either absorbent layer 20 or printable layer 30 may be on the side directly contacting chilled roller 80.

At a time simultaneous with the cooling and setting of extrudate 70 on roller 80 to form layer 40, second roller 90 is acting in physical engagement with the three-layered material to discontinuously bond or laminate first and second layers 20, 30 with the respective opposite sides of polymer layer 40 interposed therebetween.

In accordance with the invention, the surface of roller 90 has a series of raised protrusions 100 spaced around the periphery. Surface 110 of a raised protrusion 100 physically engages the first, second and extrudate layers against the surface of roller 80 to discontinuously bond or laminate the three layers at points 50 and thereby form air pockets 60 on both sides of then formed layer 40 between the respective sides of layer 40 and first and second layers 20, 30.

The size and shape of the air pockets are determined by the size and shape of protrusions 100. As embodied herein, protrusions 100 can be any shape or size with the limitations regarding air pocket size specified above and the height limitations given below constituting preferred limitations for the reasons given.

According to a preferred embodiment of the invention, the height of protrusions 100 is in the range of 0.03 to 0.07 inches, more preferably about 0.045 inches. If protrusions 100 are less than 0.03 inches, air pockets 60 may be too small as defined by this product. And if protrusions 100 are greater than 0.07 inches, then air pockets 60 may be too large and the composite wrap may pop open when compressed.

According to another preferred embodiment of the invention, when it is desirable, or specified, that air pockets 60 are formed on only one side of composite wrap 10, polymer layer 40 and layer 20 (or 30) are first extrusion coated laminated or wax coated to form a first composite having a continuous bond formed between the two respective adjacent surfaces. The composite layer thus formed is then contacted with layer 30 (or 20) as they pass through nip rollers 80, 90 as before. In this case, however, because the first composite has already been formed so that a continuous bond is formed between the two surfaces, at least one of the nip rollers must be heated to affect bonding between the last layer 30 (or 20) and the preformed composite. Temperatures suitable for this bonding will be determined by the type of materials used in the first composite, and are readily determined by a skilled artisan.

In still another preferred embodiment, composite wrap material 10 may be formed by a lamination process in which extrudate 70 is replaced by a preformed film. The preformed film is then contacted with layers 20 and 30 as before as they pass through rollers 80, 90. In this embodiment, at least one of the nip rolls must also be heated to affect bonding between the layers. Temperatures suitable for this bonding will be determined by the type of preformed material, and are readily determined by a skilled artisan.

What is claimed is:

1. A process for making an integral composite wrap material having air pockets on at least one side of a water-vapor-impermeable polymer layer and comprising an absorbent layer having an abhesive surface comprising the steps of:

providing a first layer of absorbent material comprising fibers and comprising a precursor for an absorbent material;

providing said absorbent layer with an abhesive surface by providing a foraminous hydrophobic water-vapor-permeable pellicle on at least fibers of one face of said absorbent layer;

thereafter, converting the precursor of said absorbent layer into said absorbent material, said absorbent material comprising the reaction product of in-situ crosslinking of absorbent water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in one square foot of said wrap material being sufficient to absorb at least 1 gram of water;

providing a layer of water-vapor-impermeable polymer;

conveying said water-vapor-impermeable polymer layer to a location between a pair of nip rollers rotating in opposite directions;

directing said first layer of absorbent material to said nip rollers and adjacent to one side of said water-vapor-impermeable polymer layer;

directing a second layer of a printable material to said nip rollers and adjacent to the other side of said water-vapor-impermeable polymer layer;

controlling the temperature of a surface of at least one roller of said pair of nip rollers to a temperature effective for bonding, the other roller of said pair of nip rollers having a surface with peripherally spaced protrusions extending therefrom;

passing said first and second layers and said water-vapor-impermeable polymer layer between said pair of nip rollers to control the temperature of said water-vapor impermeable polymer layer and to discontinuously bond at least one of said first and second layers to a respective side of said water-vapor-impermeable polymer layer at spaced locations to form air pockets with said water-vapor-impermeable polymer layer at locations between the bond locations.

2. The process according to claim 1, wherein said first layer comprises a sheet of cellulosic fibers, and said abhesive surface is provided by contacting the entirety of said sheet with a hydrophobe precursor and converting said hydrophobe precursor to said foraminous, hydrophobic water-vapor-permeable pellicle.

3. The process according to claim 2, wherein said first layer comprises a material selected from the group of materials consisting of nonwoven tissue, air laid fabric, wet laid tissue, wet or dry creped tissue and embossed papers and wherein said hydrophobe precursor is selected from the group consisting of precursors represented by the structural formulae I–III below:

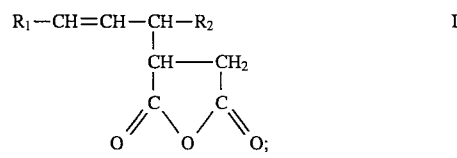

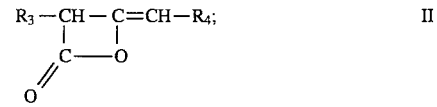

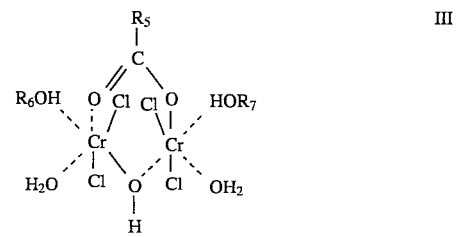

wherein $R_{1-5}$ are alkyl groups having a carbon length of 12 or greater, and $R_6$ and $R_7$ are lower alkyl groups having a carbon length of from 1 to 4.

4. The process according to claim 3, wherein said second layer comprises a material selected from the group of materials consisting of machine finished, machine glazed papers and coated papers and wherein said water insoluble reaction product is the reaction product of a water soluble anionic polymeric polyelectrolyte and a polyvalent metal cation having a valence of at least 3; said polyelectrolyte being a partially neutralized polyacrylic acid; said cation being chosen from the group consisting of zirconium, aluminum, iron, titanium and mixtures thereof; and wherein $R_{1-5}$ are at least $C_{16}$ groups and $R_{6-7}$ are methyl, ethyl or propyl groups.

5. The process according to claim 2, wherein said water-vapor-impermeable polymer comprises a material selected from the group of polymers consisting of blends of polymers with paraffin, polyethylene, polyvinylidene chloride, ethylene acrylic acid copolymer, polypropylene, polyester, polyisobutylene, nylon, polymethylpentene, ethylene vinyl acetate and mixtures thereof.

6. The process according to claim 2, wherein said first layer has fold retention and a basis weight ranging from 5 to 50 lbs/3,000 sq. ft and wherein said absorbent material is the water insoluble reaction product of a partially neutralized polyacrylic acid and a polyvalent metal cation selected from the group consisting of zirconium, aluminum, iron, titanium and mixtures thereof.

7. The process according to claim 2, wherein said absorbent material is the water insoluble reaction product of a water soluble anionic polymeric polyelectrolyte and a polyvalent metal cation having a valence of at least 3.

8. The process according to claim 7, wherein said polyelectrolyte is a partially neutralized polyacrylic acid; and said cation is chosen from the group consisting of zirconium, aluminum, iron, titanium, and mixtures thereof.

9. The process according to claim 2, wherein the water-vapor-impermeable polymer layer is polyethylene, said water insoluble reaction product is the reaction product of a water soluble anionic polymeric polyelectrolyte and a polyvalent metal cation having a valence of at least 3; and said foraminous hydrophobic water-vapor-permeable pellicle comprises the residuum of an application of an aqueous admixture of a hydrophobe precursor selected from the group consisting of precursors represented by the structural formulae I–III below:

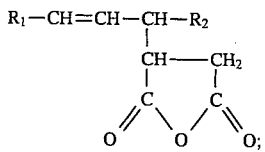
I

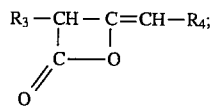
II

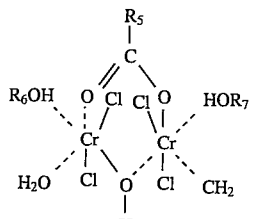
III wherein $R_{1-5}$ are alkyl groups having a carbon length of 12 or greater; and; $R_6$ and $R_7$ are lower alkyl groups having a carbon length of from 1 to 4.

10. The process according to claim 9, wherein said second layer has fold retention and a basis weight ranging from 10 to 50 lbs/3,000 sq. ft and wherein said polyelectrolyte is a partially neutralized polyacrylic acid; and said cation is chosen from the group consisting of zirconium, aluminum, iron, titanium and mixtures thereof.

11. The process according to claim 10, wherein $R_{1-5}$ are at least $C_{16}$ groups and $R_{6-7}$ are methyl, ethyl or propyl groups.

12. The process according to claim 9, wherein $R_{1-5}$ are at least $C_{16}$ groups and $R_{6-7}$ are methyl, ethyl or propyl groups.

13. A process for making an integral composite wrap material having air pockets on at least one side of a water-vapor-impermeable polymer layer comprising the steps of:

conveying a water-vapor-impermeable polymer layer to a location between a pair of nip rollers rotating in opposite directions;

directing a first layer of absorbent material comprising fibers to said nip rollers and adjacent to one side of said water-vapor-impermeable polymer layer;

directing a second layer of a printable material to said nip rollers and adjacent to the other side of said water-vapor-impermeable polymer layer;

controlling the temperature of a surface of at least one roller of said pair of nip rollers to a temperature effective for bonding, the other one of said pair of nip rollers having a surface with peripherally spaced protrusions extending therefrom;

passing said first and second layers and said water-vapor-impermeable polymer layer between said pair of nip rollers to control the temperature of said water-vapor-impermeable polymer layer and to discontinuously bond at least one of said first and second layers to a respective side of said water-vapor-impermeable polymer layer at spaced locations to form air pockets with said water-vapor-impermeable polymer layer at locations between the bond locations;

providing a foraminous hydrophobic water-vapor-permeable pellicle on at least those fibers of the face of said absorbent layer opposite to said water-vapor-impermeable polymer layer, said pellicle being formed by application of an aqueous admixture of a hydrophobe precursor selected from the group consisting of precursors represented by the structural formulae I–III below:

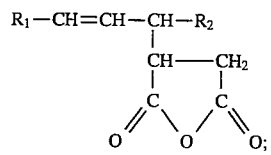
I

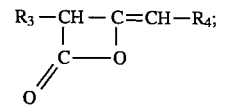
II

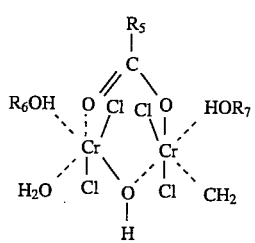
III wherein $R_{1-5}$ are alkyl groups having a carbon length of 12 or greater and $R_6$ and $R_7$ are lower alkyl groups having a carbon length of from 1 to 4.

14. The process according to claim 13, wherein said first layer comprises cellulosic fibers, and said water-vapor-impermeable polymer is polyethylene and wherein said first layer further comprises a reaction product of in-situ cross-linking of absorbent water soluble polymeric polyelectrolyte, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in one square foot of said wrap material being sufficient to absorb at least 1 gram of water.

15. The process according to claim 13, wherein said first layer comprises a material selected from the group of materials consisting of nonwoven tissue, air laid fabric, wet laid tissue, wet or dry creped tissue and embossed papers and wherein $R_{1-2}$ are $C_{18}$ groups, $R_{3-4}$ are $C_{16-18}$ groups, $R_5$ is $C_{18-19}$ and $R_{6-7}$ are isopropyl groups.

16. The process according to claim 13, wherein said second layer comprises a material selected from the group of materials consisting of machine finished papers, machine glazed papers and coated papers and wherein $R_{1-5}$ are at least $C_{16}$ groups and $R_{6-7}$ are methyl, ethyl or propyl groups.

17. The process according to claim 13, wherein said water-vapor-impermeable polymer comprises a material selected from the group of polymers consisting of blends of polymers with paraffin, polyethylene, polyvinylidene chloride, ethylene acrylic acid copolymer, polypropylene, polyester, polyisobutylene, nylon, polymethylpentene, ethylene vinyl acetate and mixtures thereof, and said first layer of absorbent material comprises a sheet of cellulosic material and an abhesive surface is provided by contacting the entirety of said sheet with said hydrophobe precursor and converting said hydrophobe precursor to said foraminous, hydrophobic water-vapor-permeable pellicle.

18. A process for making an integral composite wrap material having air pockets on at least one side of a water-vapor-impermeable polymer layer comprising the steps of:

conveying a layer of water-vapor-impermeable polymer to a location between a pair of nip rollers rotating in opposite directions;

providing a first layer of absorbent material and providing said layer of absorbent material with (i) a controlled absorbency sublayer having a water absorption capacity of less than 1 g/g, said controlled absorbency sublayer provided adjacent the face of said absorbent layer away from said water-vapor-impermeable polymer layer, and (ii) a sublayer comprising an absorbent reaction product;

directing said first layer of absorbent material to said nip rollers and adjacent to one side of said water-vapor-impermeable polymer layer;

directing a second layer of a printable material to said nip rollers and adjacent to the other side of said water-vapor-impermeable polymer layer;

controlling the temperature of a surface of at least one roller of said pair of nip rollers to a temperature effective for bonding, the other roller of said pair of nip rollers having a surface with peripherally spaced protrusions extending therefrom;

passing said first and second layers and said water-vapor-impermeable polymer layer between said pair of nip rollers to control the temperature of said water-vapor impermeable polymer layer and to discontinuously bond at least one of said first and second layers to a respective side of said water-vapor-impermeable polymer layer at spaced locations to form air pockets with said water-vapor-impermeable polymer layer at locations between the bond locations; and said absorbent reaction product contained in said first layer of absorbent material comprising the reaction product of in-situ cross-linking of absorbent water soluble polymer, said reaction product being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in one square foot of said wrap material being sufficient to absorb at least 1 gram of water.

19. A process for making an integral composite wrap material having air pockets on at least one side of a water-vapor-impermeable polymer layer comprising the steps of:

providing a sheet having first and second faces and providing a layer of fibrous absorbent material adjacent at least the first face of said sheet; providing a foraminous hydrophobic water-vapor-permeable pellicle on fibers of said fibrous absorbent material;

thereafter, in said layer of absorbent material, forming in-situ, at a location spaced away from the water-vapor-permeable pellicle, a reaction product of in-situ cross-linking of absorbent water soluble polymer, said reaction produce being water insoluble and exhibiting a water-retention capacity of at least about 10 grams of water per gram of reaction product, the amount of reaction product present on an area basis being sufficient to absorb at least about 0.001 grams of water per square centimeter, the total amount of reaction product in one square foot of said sheet being sufficient to absorb at least 1 gram of water;

conveying said sheet comprising said layer of absorbent material to a location between a pair of nip rollers rotating in opposite directions;

directing a layer of a water-vapor impermeable polymer to a location between said nip rollers, one side of said layer of water-vapor-impermeable polymer being adjacent to said second face of said sheet;

directing a layer of a printable material to said nip rollers and adjacent to the other side of said layer of water-vapor-impermeable polymer;

controlling the temperature of a surface of at least one roller of said pair of nip rollers to a temperature effective for bonding, the other roller of said pair of nip rollers having a surface with peripherally spaced protrusions extending therefrom; and passing said sheet, said layer of printable material and said water-vapor-impermeable polymer layer between said pair of nip rollers to control the temperature of said water-vapor impermeable polymer layer and to discontinuously bond at least one of said sheet or said layer of printable material to a respective side of said water-vapor-impermeable polymer layer at spaced locations to form air pockets with said water-vapor-impermeable polymer layer at locations between the bond locations.

20. The process according to claim 19, comprising the additional step of extrusion coating, laminating or wax coating one of said sheet or said printable layer with said water-vapor-impermeable polymer to form a continuously bonded first composite prior to said bonding step, and wherein said temperature controlling step is a heating step to heat said first composite for discontinuous bonding to form said air pockets.

* * * * *

UNITED STATES PATENT AND TRADEMARK OFFICE
CERTIFICATE OF CORRECTION

PATENT NO. : 5,582,674
DATED : December 10, 1996
INVENTOR(S) : Robert Patterson et al.

It is certified that error appears in the above-indentified patent and that said Letters Patent is hereby corrected as shown below:

Claim 4, column 19, line 4, "add" should read --acid--.

Claim 5, column 19, line 13, "add" should read --acid--.

Claim 6, column 19, line 20, "add" should read --acid--.

Claim 19, column 22, line 25, "produce" should read --product--.

UNITED STATES PATENT AND TRADEMARK OFFICE
CERTIFICATE OF CORRECTION

PATENT NO. : 5,582,674
DATED : December 10, 1996
INVENTOR(S) : Robert Patterson et al.

It is certified that error appears in the above-indentified patent and that said Letters Patent is hereby corrected as shown below:

Claim 9, column 19, between lines 53 and 60, and claim 13, column 20, between lines 53 and 60, delete Formula III in its entirety and substitute therefor:

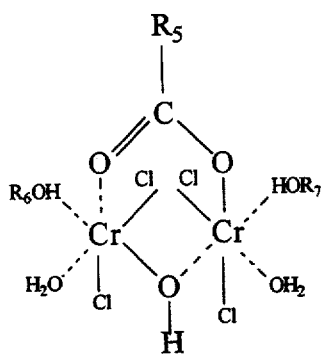

III

Signed and Sealed this

Eighteenth Day of February, 1997

Attest:

BRUCE LEHMAN

Attesting Officer

Commissioner of Patents and Trademarks